(No Model.)

A. M. LARUE.
HARVESTER ATTACHMENT.

No. 593,478. Patented Nov. 9, 1897.

Witnesses

Inventor
A. M. Larue
By Alexander Davis
Attorneys

UNITED STATES PATENT OFFICE.

ALVY M. LARUE, OF DOWNEY, IOWA.

HARVESTER ATTACHMENT.

SPECIFICATION forming part of Letters Patent No. 593,478, dated November 9, 1897.

Application filed April 1, 1897. Serial No. 630,292. (No model.)

*To all whom it may concern:*

Be it known that I, ALVY M. LARUE, a citizen of the United States, residing at Downey, in the county of Cedar and State of Iowa, have invented certain new and useful Improvements in Harvester Attachments, of which the following is a specification, reference being had therein to the accompanying drawings.

Figure 1:
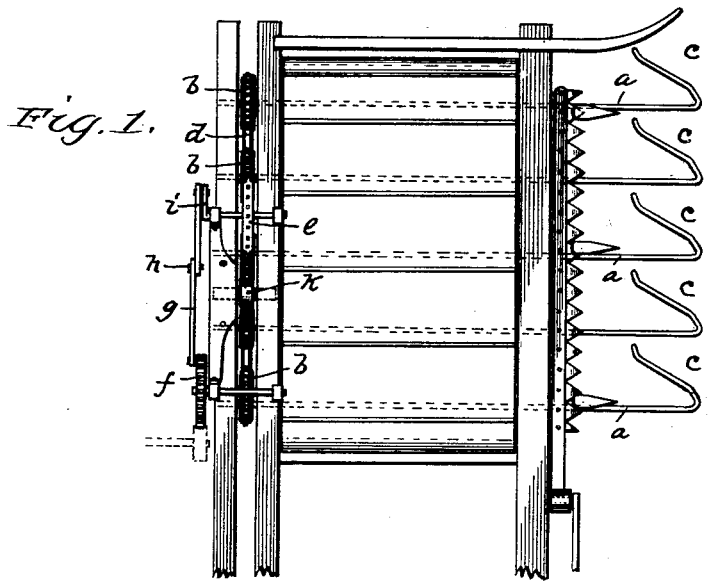
Figure 2:
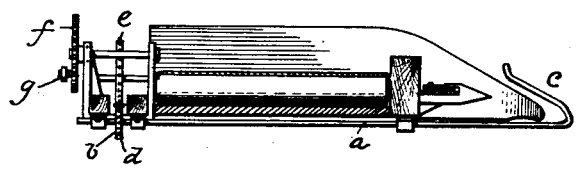
Figure 3:
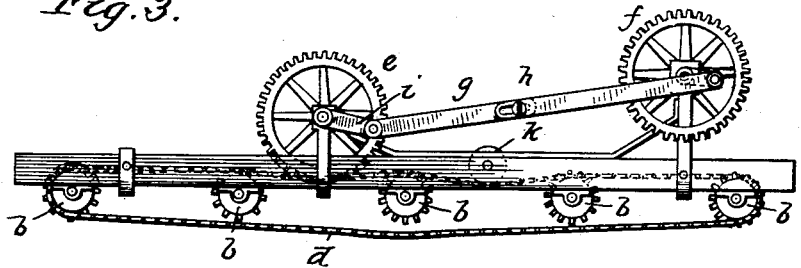

In the drawings, Figure 1 is a plan view of a portion of a harvester provided with my attachment. Fig. 2 is a transverse section thereof, and Fig. 3 a rear view of the same.

This invention is designed to provide a simple attachment for agitating and throwing up the falling grain, so that it may be readily cut and delivered to the carrier-belts, the construction being such that the grain may be cut going in any direction instead of being compelled to go in a particular direction, as is usually the case when grain is badly down, as more fully hereinafter set forth.

The invention is very simple, it consisting mainly of a series of agitators $a$, journaled underneath the harvester-platform and provided at their rear ends each with a small sprocket $b$ and having their forward ends projecting in front of the cutter-bar and bent into the form of lateral hook-like portion $c$, in combination with suitable mechanism for rocking the agitator-shafts back and forth in their bearings. The mechanism I prefer for rocking the agitator-shafts consists, essentially, of an endless sprocket-chain $d$, supported on the sprocket-wheels $b$ and driven by a larger sprocket-wheel $e$, journaled in brackets above the frame, this sprocket-wheel being in turn driven by a gear-wheel $f$ and connecting-pitman $g$, this pitman being made in two sections, adjustably connected at $h$, to compensate for the wear of the parts. The gear-wheel $f$ is rotated by suitable connection with the driving mechanism on the harvester. The pitman $g$ does not connect directly to the wheel $e$, but to a crank-arm $i$ on one end of its shaft, while the connection with the gear-wheel $f$ is directly to a wrist-pin on the wheel. The continued rotation of the wheel $f$ rocks the wheel $e$ back and forth, and this rocking movement is imparted to the agitator-shafts by the sprocket-chain. I have found that to rock the agitator-shafts about two-thirds of a revolution gives the best results, but of course I do not desire to be limited in this respect. As the agitators are rocked back and forth the lateral hook-like arms in front pass under the fallen grain as the harvester moves along and throws up the fallen grain to permit the harvester-reel to force the same back against the cutters. This continued oscillation of the hook portions effectually throws up all the down grain and enables the harvester to be driven across the field in any direction instead of in a particular direction, as must be done with the present machines when the grain is badly down.

It will be observed that this attachment is very simple and cheap in construction and will add but little to the weight of the machine, and, furthermore, may be attached to any machine in common use without material alteration.

I do not wish to be confined to any particular shape of agitating-hook $c$, nor to any particular manner of supporting the agitator-shafts, nor to the particular arrangement of gearing and means for supporting the same.

To keep the sprocket-chain down on the sprockets $b$, I journal one or more idler-pulleys $k$ in the frame above the chain, as shown.

Having thus fully described my invention, what I claim, and desire to secure by Letters Patent, is—

1. A harvester attachment consisting of a series of rock-shafts projecting in front of the cutter-bar and provided with lateral arms to engage under and throw up fallen grain, and means for driving said shafts, substantially as described.

2. A harvester attachment consisting of a series of rock-shafts carried by the harvester-frame and projecting in front of the cutter-bars and there provided with lateral agitator-arms adapted to pass under and throw up the fallen grain, and means for simultaneously rocking said shafts back and forth, substantially as described.

3. The combination with a harvester, of a series of agitators projecting in front of the cutter-bars, a sprocket-wheel on each of the agitators, an endless sprocket-chain engaging said sprocket-wheels, a rocking driving-sprocket engaging said chain, and means for rocking said sprocket, substantially as described.

In testimony whereof I affix my signature in presence of two witnesses.

ALVY M. LARUE.

Witnesses:
J. E. McINTOSH,
C. J. BAXTER.